United States Patent
daCosta (12)

(10) Patent No.: US 6,954,617 B2
(45) Date of Patent: Oct. 11, 2005

(54) APPARATUS AND METHOD TO IMPROVE GOODPUT IN UNRELIABLE NETWORKS

(75) Inventor: Behram M. daCosta, San Diego, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 182 days.

(21) Appl. No.: 10/403,631

(22) Filed: Mar. 31, 2003

(65) Prior Publication Data

US 2004/0192213 A1 Sep. 30, 2004

(51) Int. Cl.$^7$ .................................................. H04B 1/00
(52) U.S. Cl. .................. 455/63.1; 455/67.13; 370/229; 370/448; 370/461
(58) Field of Search ............................ 455/63.1, 67.11, 455/67.13; 370/229, 235, 236, 447, 448, 461

(56) References Cited

U.S. PATENT DOCUMENTS

2001/0014088 A1 * 8/2001 Johnson et al. ............. 370/338

* cited by examiner

*Primary Examiner*—Lee Nguyen
(74) *Attorney, Agent, or Firm*—Blakely, Sokoloff, Taylor & Zafman, LLP

(57) ABSTRACT

Apparatus and method for controlling transmissions on a network from a source to a destination. A transmission is received from the destination. A signal characteristic of the transmission is determined. A statistical measure is updated using the signal characteristic. The statistical measure is compared to a threshold value. A data transmission from the source to the destination is deferred for a first time period if the comparison of the statistical measure fails. The data is transmitted from the source to the destination after the deferral, if any.

80 Claims, 2 Drawing Sheets

APPARATUS AND METHOD TO IMPROVE GOODPUT IN UNRELIABLE NETWORKS

BACKGROUND OF THE INVENTION

An increasing number of applications depend on Network Quality of Service (QoS) for their performance. For example, in home networks, a home media server streams video to client devices throughout the home. Better QoS, and better bandwidth, allows the server to stream higher fidelity content to client devices. Hence it is important to optimize QoS and network bandwidth.

It is particularly important for unreliable and lower bandwidth networks such as wireless networks to optimize QoS and network bandwidth. The available bandwidth is consumed by the goodput, successful data transmissions, the badput, unsuccessful data transmissions, and the transmission overhead, non-data transmissions. Improving goodput and reducing badput results in better utilization of the available bandwidth. In unreliable networks, such as wireless networks, it is beneficial to be able to predict when communication between a source node and destination node is likely to fail. Predicted unreliability in the form a high communication failure rates may allow applications executing on the source node to make intelligent choices regarding the use of the network.

SUMMARY OF THE INVENTION

Apparatus and method for controlling transmissions on a network from a source to a destination. A transmission is received from the destination. A signal characteristic of the transmission is determined. A statistical measure is updated using the signal strength. The statistical measure is compared to a threshold value. A data transmission from the source to the destination is deferred for a first time period if the comparison of the statistical measure fails. The data is transmitted from the source to the destination after the deferral, if any.

DETAILED DESCRIPTION OF THE INVENTION

The inventive apparatus and method determine when communication is unreliable and communication failures are likely. The apparatus and method may further determines whether the unreliability is caused by active or passive interference. This may allow applications to (a) postpone communication between nodes until reliability increases, and instead use the available bandwidth for the source node to communicate with a different destination node in the interim, and (b) in the case that the decrease in reliability is due to active interference on the channel, to decide to take other action, such as switching communication channels or increasing transmitting power.

It is known to use Acknowledgment (ACK) packets or Negative Acknowledgment (NACK) packets sent from Node B (original data receiver) to Node A (original data sender) to detect communication failures in data transmissions from Node A to Node B. In the case of a missing ACK, the cause could also be failure of ACK transmission from Node B to Node A, even though the original data was actually successfully transmitted from Node A to Node B.

The inventive apparatus and method tracks the signal characteristics of reverse data transmissions sent from Node B (original data receiver) to Node A (original data sender) to predict when normal transmissions to be sent from Node A to Node B are likely to fail. While the tracked signal characteristics will be described in terms of the use of signal strength, the signal to interference and noise ratio (SINR), the uncoded bit error rate (UBER), or another signal characteristic that is related to the quality of transmission may also be used, singly or in combination. In 802.11 wireless networks for example, signal strength is a value that can be made available by the Network Physical Layer Implementation (PHY) where the signal strength value is proportional to the radio frequency (RF) power contained in the frequency band used by the received data transmission. Similar indications of signal strength may be obtained for other transmission mediums. While the data transmissions from Node B will be described in terms of the use of ACK packets, NACK packets or other data transmissions sent on a periodic basis from Node B to Node A may also be used.

Figure 1:
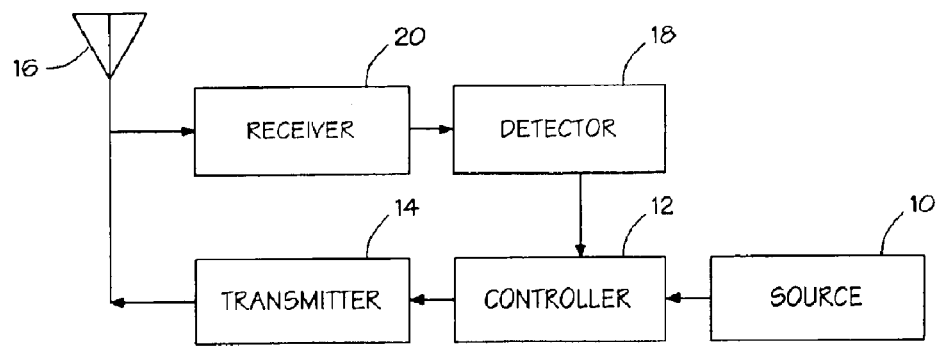
FIG. 1 is a block diagram of a portion of a device that includes an embodiment of the invention.

FIG. 1 is a block diagram of a device that includes an embodiment of the invention. The device of FIG. 1 is a transmitting node, Node A. The device may include additional elements not shown in FIG. 1. The additional elements are not required for the operation of the invention and have not been shown to allow the inventive portion of the device to seen more clearly. The device includes a data source 10 that provides data to be transmitted on a wireless network. The data source 10 may be a transceiver that receives data from one or more external sources and makes it available to the elements in the device that transmit data.

A controller 12 responds to the availability of data from the data source 10 by causing a transmitter 14 to transmit the data through an antenna 16. The data may move directly from the data source 10 to the transmitter 14 under the direction of the controller 12.

The device predicts the likelihood of successfully transmitting the data and may defer a transmission that is predicted to fail. To make the prediction, the controller monitors the characteristics of signals received by the device. The receiving node, Node B, may transmit an acknowledgment (ACK) back to Node A to acknowledge a successful data transmission to Node B. In other embodiments, Node B may make other types of periodic transmissions to Node A. The transmission from Node B may be received on the antenna 16 which is coupled to a receiver 20. A detector 18 may provide a measure of the signal characteristics of the received signal to the controller 12. Other configurations may be used with the invention such as separate antennas or combining two or more of the functional blocks such as using a transceiver to combine the functions of the transmitter 14 and the receiver 20.

Figure 2:
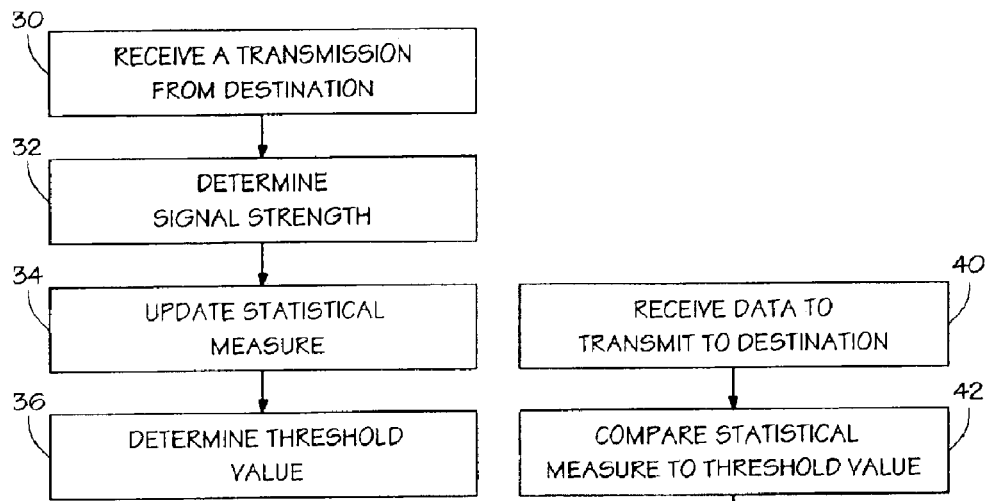
FIG. 2 is a flowchart for a procedure used by an embodiment of the invention.

As shown in FIG. 2, the controller 10 receives a transmission from the destination device 30, determines a signal strength for the received transmission 32, and maintains a statistical measure of signal characteristics 34, for example signal strengths, of data transmissions sent from Node B that correspond to successful data transmissions from Node A.

In one embodiment, the controller 12 may maintain a running average and running standard deviation of the signal strength (AckStrength) for all received ACKs from Node B. In another embodiment, the controller 12 may maintain the statistical measure of the signal strength of the n ACKs (n>=1) with the lowest signal strengths. A running average may be calculated by storing the most recent n observations of the lowest signal strengths and taking the arithmetic mean of those n observations each time a signal strength lower than the highest of the is n observations observed. In another embodiment, a running average may be calculated as follows:

$$A = p \times O + (1-p) \times R$$

where

A is the running average, p is a constant, 0<p<1,

O is the value of the new observation, and

R is the previous value of the running average.

Other methods of calculating a running average that provide a statistical measure of the central tendency over time may be used. A running standard deviation may be calculated by analogous methods.

In yet another embodiment, statistics are used to create a probability distribution function (PDF) of the signal strength (or other metric) as the statistical measure that is then used to determine the probability of a failed transmission for the next transmission.

The controller 12 determines a threshold value 36 for the statistical measure to establish the conditions that suggest that data transmissions from Node A are likely to fail. In one embodiment, the threshold value may be set at the running average of the n lowest signal strengths for successful data transmissions minus one standard deviation. When the observed signal strength of a data transmission from Node B falls below the threshold, it is predicted that a data transmission from Node A is likely to fail.

Figure 3A:
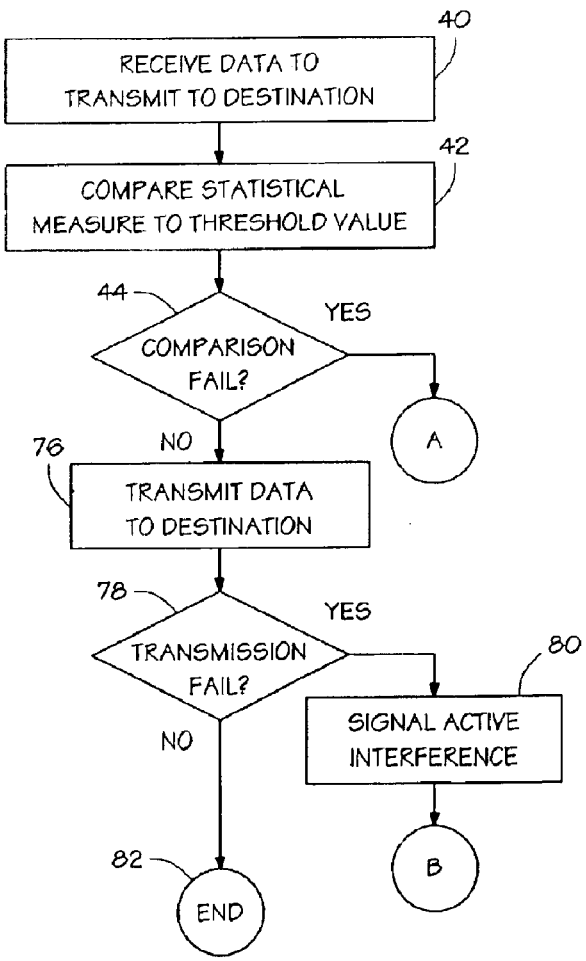
FIG. 3 is a flowchart for another procedure used by an embodiment of the invention. The flowchart is presented on two sheets as FIGS. 3A and 3B with like lettered circles indicating continued logic flow between the two sheets.
Figure 3B:
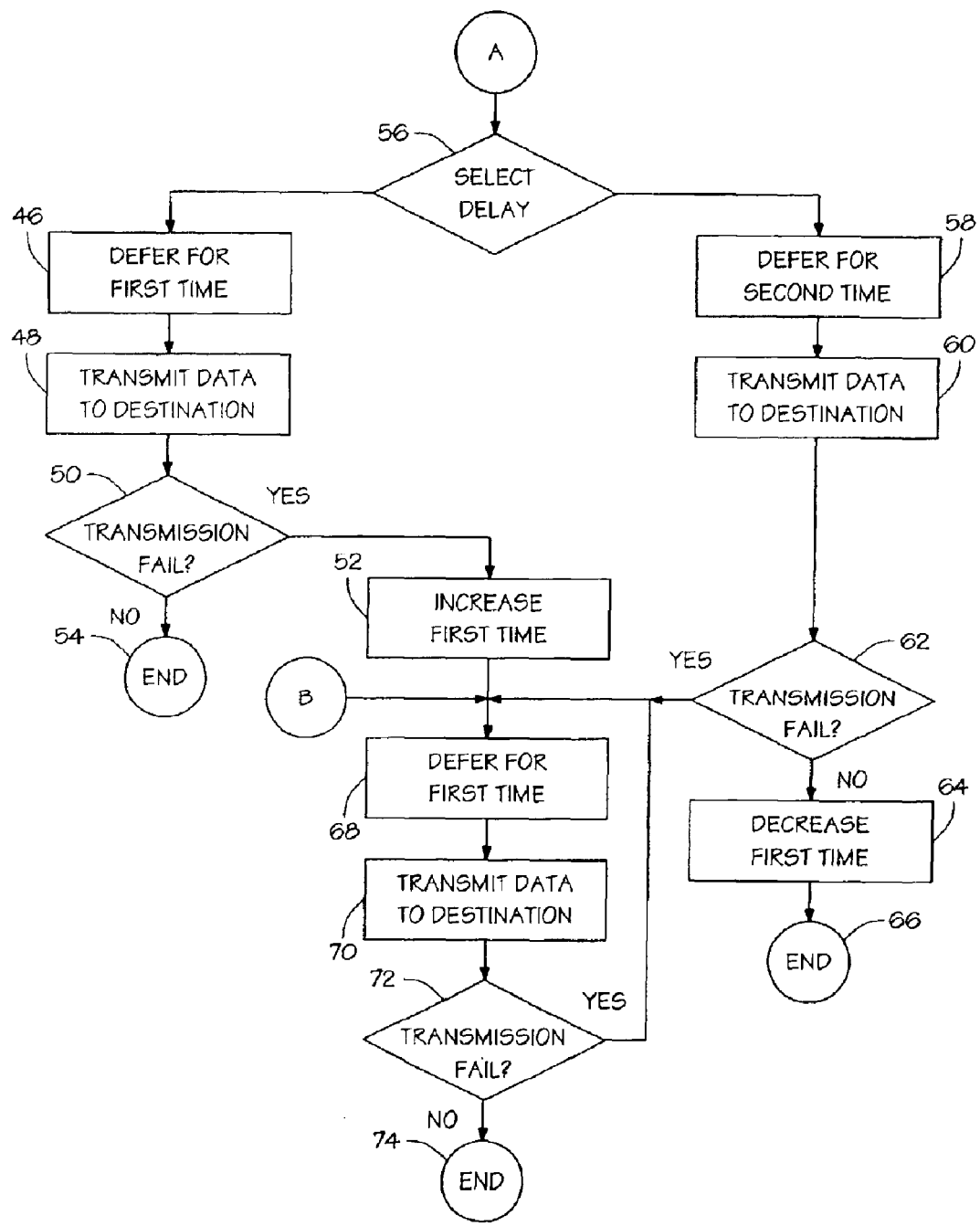

The controller 12 performs the method illustrated in FIG. 3 when data is received for transmission to the destination 40, Node B. The statistical measure is compared to the threshold value 42 and the result of the comparison is used to select a procedure for transmitting the data 44.

If the comparison fails, data transmissions from Node A are predicted to be likely to fail, and transmissions from Node A to Node B are deferred for a first time period 46. During this time period Node A may transmit to other nodes in the network. After the first time period has passed, an attempt is made to transmit from Node A to Node B 48. If the transmission is successful 50, the method ends 54.

If the transmission is unsuccessful 50, transmission from Node A to Node B is again deferred 68. Node A may maintain a statistical measure, such as a running average, of the total length of time before successful transmission from Node A to Node B resumes. The statistical measure of the length of time before successful transmission resumes may be used to update the first time period 52 used to defer transmission on subsequent transmissions when failures are predicted. The cycle of deferring transmission 68 and transmitting 70 continues until the data is successfully transmitted 72 and the method ends 74.

In one embodiment, the delay is selected 56 and a data transmission is deferred for the first time period 46 for a portion of data transmissions, and the remaining data transmissions from the source to the destination are deferred for a second time period 58 that is shorter than the first time period. The selection 56 of the first time period or the second time period for a deferral may be made randomly or on some methodical basis.

The occasional shorter delay may allow changing transmission conditions to update the first time period to provide a shorter deferral. After the shorter second time period deferral 58, the data is transmitted to the receiving node 60. If the transmission does not fail 62, the first time period delay may be decreased 64, and the method ends 66. If the transmission is unsuccessful 50, transmission from Node A to Node B is again deferred 68. The cycle of deferring transmission 68 and transmitting 70 continues until the data is successfully transmitted 72 and the method ends 74.

Using the above method, total available bandwidth may be allocated to links that can make best use of it, instead of wasting bandwidth by attempting to transmit to nodes with a high probability of transmission failure. This method may be augmented by the following additional techniques.

Transmission failures may occur even when the received signal strength of the immediately preceding ACKs is consistently high. This may be the case when there is active interference, and the PHY is incapable of reporting the difference between power of the ACK signal itself, and other power in the band containing the ACK signal that may in fact be interfering with the ACK signal. When there is no correlation between signal strengths in the ACK immediately preceding a failed transfer and the threshold value for predicting likelihood of transmission failures, the interference may be assumed to be active in nature.

If the comparison of the statistical measure to the threshold value 42 does not fail 44, which is a prediction of a successful transmission, the data is transmitted to the destination 76 without a deferral time period. If the transmission is successful 78, the method ends 82.

If the transmission fails 78 despite the prediction of success 44, it is assumed that there is active interference and the presence of active interference is signaled 80. In another embodiment where SINR is available, this may be used to provide an indication of active interference. Thereafter, transmission from Node A to Node B is deferred 68 and then transmission is reattempted 70. The cycle of deferring transmission 68 and transmitting 70 continues until the data is successfully transmitted 72 and the method ends 74. When active interference is signaled, the channel being used for transmission may be changed to a channel on which active interference has not been detected, or other steps may be taken to mitigate the active interference, in addition to or instead of deferring the transmission.

Detection of transmission failures as part of the above described techniques may be used to determine when to increase transmit power, or use different modulation schemes, or increase the number of bytes for error recovery at the destination node.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. The inventive method can be used for protocols including those in which each data packet is or is not immediately followed by an ACK, and in protocols for which multiple data packets, whether or not immediately following each other in time, are followed by a single ACK. The inventive method is not limited to specific link-layer protocols to improve network performance, such as enhancements to the IEEE 802.11 standard to improve wireless Quality of Service (QoS) and bandwidth. The inventive method may not require injecting additional data into the network.

What is claimed is:

1. An apparatus for controlling transmissions on a network from a source to a destination, comprising:
   a transmitter to transmit a data transmission from the source to the destination;
   a receiver to receive an Acknowledgment (ACK) packet as a reply transmission from the destination;
   a detector coupled to the receiver, the detector to determine a signal characteristic of the reply transmission;
   a controller coupled to the detector and to the transmitter, the controller to update a statistical measure using the signal characteristic,
      to compare the statistical measure to a threshold value,
      to defer a data transmission from the source to the destination for a first time period if the comparison of the statistical measure fails; and
      to cause the transmitter to transmit the data transmission.

2. The apparatus of claim 1, wherein the signal characteristic of the reply transmission is proportional to a radio frequency (RF) power contained in the frequency band used by the transmission from the destination during reception of the reply transmission by the source.

3. The apparatus of claim 1, wherein the statistical measure is a running average.

4. The apparatus of claim 1, wherein the controller is further to set the threshold value responsive to the statistical measure if the data transmission fails.

5. The apparatus of claim 1, wherein the controller is further to increase the first time period if the data transmission fails.

6. The apparatus of claim 5, wherein the controller further is:
   to defer the data transmission for the first time period for a portion of data transmissions;
   to defer the remaining data transmissions from the source to the destination for a second time period that is shorter than the first time period; and,
   to decrease the first time period if the data transmission deferred for the second time period does not fail.

7. The apparatus of claim 1, wherein the controller is further to signal active interference if the comparison of the statistical measure does not fail and if the data transmission fails.

8. A method for controlling transmissions on a network from a source to a destination, comprising:
   receiving an Acknowledgment (ACK) packet as a reply transmission from the destination;
   determining a signal characteristic of the reply transmission;
   updating a statistical measure using the signal characteristic;
   comparing the statistical measure to a threshold value;
   deferring a data transmission from the source to the destination for a first time period if the comparison of the statistical measure fails; and
   transmitting the data transmission from the source to the destination.

9. The method of claim 8, wherein determining the signal characteristic of the reply transmission further comprises receiving a value from a Physical Layer Implementation (PHY) that is proportional to a radio frequency (RF) power contained in the frequency band used by the reply transmission from the destination during reception of the reply transmission by the source.

10. The method of claim 8, wherein the statistical measure is a running average.

11. The method of claim 8, further comprising setting the threshold value responsive to the statistical measure if the data transmission fails.

12. The method of claim 8, further comprising increasing the first time period if the data transmission fails.

13. The method of claim 12, wherein deferring the data transmission for the first time period is performed for a portion of data transmissions, and the remaining data transmissions from the source to the destination are deferred for a second time period that is shorter than the first time period, and further comprising decreasing the first time period if the data transmission deferred for the second time period does not fail.

14. The method of claim 8, further comprising signaling active interference if the data transmission fails and there is no correlation between the failure and the statistical measure.

15. An apparatus for controlling transmissions on a network from a source to a destination, comprising:
   receiver means for receiving an Acknowledgment (ACK) packet as a reply transmission from the destination;
   detector means coupled to the receiver means, the detector means for determining a signal strength of the reply transmission;
   controller means coupled to the detector means and to the transmitter means, the controller means for
      updating a statistical measure using the signal characteristic,
      comparing the statistical measure to a threshold value,
      deferring a data transmission from the source to the destination for a first time period if the comparison of the statistical measure fails, and,
      transmitting the data transmission from the source to the destination.

16. The apparatus of claim 15, wherein the detector means is further for receiving a value from a Physical Layer Implementation (PHY) that is proportional to a radio frequency (RF) power contained in the frequency band used by the reply transmission from the destination during reception of the reply transmission by the source.

17. The apparatus of claim 15, wherein the statistical measure is a running average.

18. The apparatus of claim 15, wherein the controller means is further for setting the threshold value responsive to the statistical measure if the data transmission fails.

19. The apparatus of claim 15, wherein the controller means is further for increasing the first time period if the data transmission fails.

20. The apparatus of claim 19, wherein the controller means is further for:
   deferring the data transmission for the first time period for a portion of data transmissions;
   deferring the remaining data transmissions from the source to the destination for a second time period that is shorter than the first time period; and,
   decreasing the first time period if the data transmission deferred for the second time period does not fail.

21. The apparatus of claim 15, wherein the controller means is further for signaling active interference if the data transmission fails and there is no correlation between the failure and the statistical measure.

22. A computer-readable medium having a sequence of instructions, the sequences of instructions, when executed by a processor, causing the processor to perform a method for controlling transmissions on a network from a source to a destination, the method comprising:

receiving an Acknowledgment (ACK) packet as a reply transmission from the destination;

determining a signal characteristic of the reply transmission;

updating a statistical measure using the signal characteristic;

comparing the statistical measure to a threshold value;

deferring a data transmission from the source to the destination for a first time period if the comparison of the statistical measure fails; and causing a transmitter to transmit the data transmission from the source to the destination.

23. The computer-readable medium of claim 22, wherein determining the signal characteristic of the reply transmission further comprises receiving a value from a Physical Layer Implementation (PHY) that is proportional to a radio frequency (RF) power contained in the frequency band used by the reply transmission from the destination during reception of the reply transmission by the source.

24. The computer-readable medium of claim 22, wherein the statistical measure is a running average.

25. The computer-readable medium of claim 22, wherein the method further comprises setting the threshold value responsive to the statistical measure if the data transmission fails.

26. The computer-readable medium of claim 22, wherein the method further comprises increasing the first time period if the data transmission fails.

27. The computer-readable medium of claim 26, wherein deferring the data transmission for the first time period is performed for a portion of data transmissions, and the remaining data transmissions from the source to the destination are deferred for a second time period that is shorter than the first time period, and the method further comprises decreasing the first time period if the data transmission deferred for the second time period does not fail.

28. The computer-readable medium of claim 22, wherein the method further comprises signaling active interference if the data transmission fails and there is no correlation between the failure and the statistical measure.

29. An apparatus for controlling transmissions on a network from a source to a destination, comprising:

a transmitter to transmit a data transmission from the source to the destination;

a receiver to receive an Acknowledgment (ACK) packet as a reply transmission from the destination;

a detector coupled to the receiver, the detector to determine a signal characteristic of the reply transmission;

a controller coupled to the detector and to the transmitter, the controller to update a statistical measure using the signal characteristic, to compare the statistical measure to a threshold value, to defer a first data transmission from the source to the destination for a first time period and to defer a second data transmission from the source to the destination for a second time period that is shorter than the first time period, if the comparison of the statistical measure fails;

to cause the transmitter to transmit the data transmission;

to increase the first time period if the first data transmission fails;

to decrease the first time period if the second data transmission does not fail.

30. The apparatus of claim 29, wherein the reply transmission from the destination is an Acknowledgment (ACK) packet.

31. The apparatus of claim 29, wherein the signal characteristic of the reply transmission is proportional to a radio frequency (RF) power contained in the frequency band used by the transmission from the destination during reception of the reply transmission by the source.

32. The apparatus of claim 29, wherein the statistical measure is a running average.

33. The apparatus of claim 29, wherein the controller is further to set the threshold value responsive to the statistical measure if the data transmission fails.

34. The apparatus of claim 29, wherein the controller is further to signal active interference if the comparison of the statistical measure does not fail and if the data transmission fails.

35. A method for controlling transmissions on a network from a source to a destination, comprising;

receiving a reply transmission from the destination;

determining a signal characteristic of the reply transmission;

updating a statistical measure using the signal characteristic;

comparing the statistical measure to a threshold value;

deferring a first data transmission from the source to the destination for a first time period and deferring a second data transmission from the source to the destination for a second time period that is shorter than the first time period, if the comparison of the statistical measure fails;

transmitting the data transmission from the source to the destination;

increasing the first time period if the first data transmission fails; and decreasing the first time period if the second data transmission does not fail.

36. The method of claim 35, wherein the reply transmission from the destination is an Acknowledgment (ACK) packet.

37. The method of claim 35, wherein determining the signal characteristic of the reply transmission further comprises receiving a value from a Physical Layer Implementation (PHY) that is proportional to a radio frequency (RF) power contained in the frequency band used by the reply transmission from the destination during reception of the reply transmission by the source.

38. The method of claim 35, wherein the statistical measure is a running average.

39. The method of claim 35, further comprising setting the threshold value responsive to the statistical measure if the data transmission fails.

40. The method of claim 35, further comprising signaling active interference if the data transmission fails and there is no correlation between the failure and the statistical measure.

41. An apparatus for controlling transmission on a network from a source to a destination, comprising:

receiver means for receiving a reply transmission from the destination;

detector means coupled to the receiver means, the detector means for determining a signal strength of the reply transmission;

controller means coupled to the detector means and to the transmitter means, the controller means for updating a statistical measure using the signal characteristic, comparing the statistical measure to a threshold value, deferring a first data transmission from the source to the destination for a first time period and deferring a second data transmissions from the source to the destination for a second time period that is shorter than the first time period, if the comparison of the statistical measure fails, and, transmitting the data transmission from the source to the destination, increasing the first time period if the first data transmission fails, decreasing the first time period if the second data transmission does not fail.

42. The apparatus of claim 41, wherein the reply transmission from the destination is an Acknowledgment (ACK) packet.

43. The apparatus of claim 41, wherein the detector means is further for receiving a value from a Physical Layer Implementation (PHY) that is proportional to a radio frequency (RF) power contained in the frequency band used by the reply transmission from the destination during reception of the reply transmission by the source.

44. The apparatus of claim 41, wherein the statistical measure is running average.

45. The apparatus of claim 41, wherein the controller means is further for setting the threshold value responsive to the statistical measure if the data transmission fails.

46. The apparatus of claim 41, wherein the controller means is further for signaling active interference if the data transmission fails and there is no correlation between the failure and the statistical measure.

47. A computer-readable medium having a sequence of instructions, the sequences of instructions, when executed by a processor, causing the processor to perform a method for controlling transmissions on a network from a source to a destination, the method comprising:

receiving a reply transmission from the destination;

determining a signal characteristic of the reply transmission;

updating a statistical measure using the signal characteristic;

comparing the statistical measure to a threshold value;

deferring a first data transmission from the source to the destination for a first time period for a portion of data transmissions and deferring a second data transmission from the source to the destination for a second time period that is shorter than the first time period, if the comparison of the statistical measure fails;

causing a transmitter to transmit the data transmission from the source to the destination;

increasing the first time period if the first data transmission fails; and decreasing the first time period if the second data transmission does not fail.

48. The computer-readable medium of claim 47, wherein the reply transmission from the destination is an Acknowledgment (ACK) packet.

49. The computer-readable medium of claim 47, wherein determining the signal characteristic of the reply transmission further comprises receiving a value from a Physical Layer Implementation (PHY) that is proportional to a radio frequency (RF) power contained in the frequency band used by the reply transmission from the destination during reception of the reply transmission by the source.

50. The computer-readable medium of claim 47, wherein the statistical measure is a running average.

51. The computer-readable medium of claim 47, wherein the method further comprises setting the threshold value responsive to the statistical measure if the data transmission fails.

52. The computer-readable medium of claim 47, wherein the method further comprises signaling active interference if the data transmission fails and there is no correlation between the failure and the statistical measure.

53. An apparatus for controlling transmissions on a network from a source to a destination, comprising:

a transmitter to transmit a data transmission from the source to the destination;

a receiver to receive an Acknowledgment (ACK) packet as a reply transmission from the destination;

a detector coupled to the receiver, the detector to determine a signal characteristic of the reply transmission;

a controller coupled to the detector and to the transmitter, the controller to update a statistical measure using the signal characteristic, to compare the statistical measure to a threshold value, to defer a data transmission from the source to the destination for a first time period if the comparison of the statistical measure fails;

to cause the transmitter to transmit the data transmission; and to signal active interference if the comparison of the statistical measure does not fail and if the data transmission fails.

54. The apparatus of claim 53, wherein the reply transmission from the destination is an Acknowledgment (ACK) packet.

55. The apparatus of claim 53, wherein the signal characteristic of the reply transmission is proportional to a radio frequency (RF) power contained in the frequency band used by the transmission from the destination during reception of the reply transmission by the source.

56. The apparatus of claim 53, wherein the statistical measure is a running average.

57. The apparatus of claim 53, wherein the controller is further to set the threshold value responsive to the statistical measure if the data transmission fails.

58. The apparatus of claim 53, wherein the controller is further to increase the first time period if the data transmission fails.

59. The apparatus of claim 58, wherein the controller further is:

to defer the data transmission for the first time period for a portion of data transmissions;

to defer the remaining data transmissions from the source to the destination for a second time period that is shorter than the first time period; and, to decrease the first time period if the data transmission deferred for the second time period does not fail.

60. A method for controlling transmissions on a network from a source to a destination, comprising:

receiving a reply transmission from the destination;

determining a signal characteristic of the reply transmission;

updating a statistical measure using the signal characteristic;

comparing the statistical measure to a threshold value;

deferring a data transmission from the source to the destination for a first time period if the comparison of the statistical measure fails;

transmitting the data transmission from the source to the destination; and signaling active interference if the data transmission fails and there is no correlation between the failure and the statistical measure.

61. The method of claim 60, wherein the reply transmission from the destination is an Acknowledgment (ACK) packet.

62. The method of claim 60, wherein determining the signal characteristic of the reply transmission further comprises receiving a value from a Physical Layer Implementation (PHY) that is proportional to a radio frequency (RF) power contained in the frequency band used by the reply transmission from the destination during reception of the reply transmission by the source.

63. The method of claim 60, wherein the statistical measure is a running average.

64. The method of claim 60, further comprising setting the threshold value responsive to the statistical measure if the data transmission fails.

65. The method of claim 60, further comprising increasing the first time period if the data transmission fails.

66. The method of claim 65, wherein deferring the data transmission for the first time period is performed for a portion of data transmissions, and the remaining data transmissions from the source to the destination are deferred for a second time period that is shorter than the first time period, and farther comprising decreasing the first time period if the data transmission deferred for the second time period does not fail.

67. An apparatus for controlling transmissions on a network from a source to a destination, comprising:

receiver means for receiving a reply transmission from the destination;

detector means coupled to the receiver means, the detector means for determining a signal strength of the reply transmission;

controller means coupled to the detector means and to the transmitter means, the controller means for
updating a statistical measure using the signal characteristic, comparing the statistical measure to a threshold value,
deferring a data transmission from the source to the destination for a first time period if the comparison of the statistical measure fails,
transmitting the data transmission from the source to the destination, and,
signaling active interference if the data transmission fails and there is no correlation between the failure and the statistical measure.

68. The apparatus of claim 67, wherein the reply transmission from the destination is an Acknowledgment (ACK) packet.

69. The apparatus of claim 67, wherein the detector means is further for receiving a value from a Physical Layer Implementation (PHY) that is proportional to a radio frequency (RF) power contained in the frequency band used by the reply transmission from the destination during reception of the reply transmission by the source.

70. The apparatus of claim 67, wherein the statistical measure is a running average.

71. The apparatus of claim 15, wherein the controller means is further for setting the threshold value responsive to the statistical measure if the data transmission fails.

72. The apparatus of claim 67, wherein the controller means is further for increasing the first time period if the data transmission fails.

73. The apparatus of claim 72, wherein the controller means is further for:

deferring the data transmission for the first time period for a portion of data transmissions;

deferring the remaining data transmissions from the source to the destination for a second time period that is shorter than the first time period; and, decreasing the first time period if the data transmission deferred for the second time period does not fail.

74. A computer-readable medium having a sequence of instructions, the sequences of instructions, when executed by a processor, causing the processor to perform a method for controlling transmissions on a network from a source to a destination, the method comprising:

receiving a reply transmission from the destination;

determining a signal characteristic of the reply transmission;

updating a statistical measure using the signal characteristic;

comparing the statistical measure to a threshold value;

deferring a data transmission from the source to the destination for a first time period if the comparison of the statistical measure fails;

causing a transmitter to transmit the data transmission from the source to the destination; and signaling active interference if the data transmission fails and there is no correlation between the failure and the statistical measure.

75. The computer-readable medium of claim 74, wherein the reply transmission from the destination is an Acknowledgment (ACK) packet.

76. The computer-readable medium of claim 74, wherein the signal characteristic of the reply transmission further comprises receiving a value from a Physical Layer Implementation (PHY) that is proportional to a radio frequency (RF) power contained in the frequency band used by the reply transmission from the destination during reception of the reply transmission by the source.

77. The computer-readable medium of claim 74, wherein the statistical measure is a running average.

78. The computer-readable medium of claim 74, wherein the method further comprises setting the threshold value responsive to the statistical measure if the data transmission fails.

79. The computer-readable medium of claim 74, wherein the method further comprises increasing the first time period if the data transmission fails.

80. The computer-readable medium of claim 79, wherein deferring the data transmission for the first time period is performed for a portion of data transmissions, and the remaining data transmissions from the source to the destination are deferred for a second time period that is shorter than the first time period, and the method further comprises decreasing the first time period if the data transmission deferred for the second time period does not fail.

* * * * *